(12) United States Patent
Kurata (10) Patent No.: US 9,894,284 B2
(45) Date of Patent: Feb. 13, 2018

(54) IMAGING CONTROL DEVICE, IMAGING APPARATUS, AND IMAGING CONTROL METHOD

(71) Applicant: SONY SEMICONDUCTOR SOLUTIONS CORPORATION, Kanagawa (JP)

(72) Inventor: Koji Kurata, Tokyo (JP)

(73) Assignee: SONY SEMICONDUCTOR SOLUTIONS CORPORATION, Kanagawa (JP)

( * ) Notice: Subject to any disclaimer, the term of this patent is extended or adjusted under 35 U.S.C. 154(b) by 0 days.

(21) Appl. No.: 15/323,208

(22) PCT Filed: May 29, 2015

(86) PCT No.: PCT/JP2015/065576
§ 371 (c)(1),
(2) Date: Dec. 30, 2016

(87) PCT Pub. No.: WO2016/009729
PCT Pub. Date: Jan. 21, 2016

(65) Prior Publication Data
US 2017/0142311 A1 May 18, 2017

(30) Foreign Application Priority Data

Jul. 18, 2014 (JP) ................................. 2014-147583

(51) Int. Cl.
*H04N 5/235* (2006.01)
*H04N 5/265* (2006.01)
(52) U.S. Cl.
CPC ........... *H04N 5/2352* (2013.01); *H04N 5/265* (2013.01)

(58) Field of Classification Search
CPC .... H04N 5/2352; H04N 5/265; H04N 5/2353; H04N 5/3535; H04N 5/35536; H04N 5/35581
See application file for complete search history.

(56) References Cited

U.S. PATENT DOCUMENTS 7,453,496 B2 * 11/2008 Suzuki ................... H04N 5/235
348/216.1
7,649,554 B2 * 1/2010 Suzuki ................... H04N 5/235
348/216.1

(Continued)

FOREIGN PATENT DOCUMENTS

JP 08-214211 A 8/1996
JP 2005-072965 A 3/2005

(Continued)

OTHER PUBLICATIONS

International Search Report and Written Opinion of PCT Application No. PCT/JP2015/065576, dated Aug. 25, 2015, 5 pages of English Translation and 5 pages of ISRWO.

(Continued)

*Primary Examiner* — Luong T Nguyen
(74) *Attorney, Agent, or Firm* — Chip Law Group (57) ABSTRACT

To obtain an appropriate exposure condition even in second photographing when generating an image with an expanded dynamic range. An exposure control unit controls an imaging element including a normal pixel for generating an image signal and a low-sensitivity pixel for generating a low-sensitivity image signal and having lower photoelectric conversion sensitivity to visible light than the normal pixel under a predetermined exposure condition and causes the imaging element to output the image signal and the low-sensitivity image signal. A low-sensitivity histogram generating unit generates a low-sensitivity histogram indicating an appearance frequency distribution of the low-sensitivity (Continued)

image signal based on the low-sensitivity image signal. A short-time exposure condition calculating unit calculates a short-time exposure condition with an exposure time shorter than the exposure condition based on the generated low-sensitivity histogram. A short-time exposure control unit controls the imaging element under the calculated short-time exposure condition and causes the imaging element to output a short-time exposure image signal as an image signal generated by the normal pixel. A combining unit combines the image signal and the short-time exposure image signal.

5 Claims, 8 Drawing Sheets

(56) References Cited

U.S. PATENT DOCUMENTS

| | | | |
|---|---|---|---|
| 8,446,480 B2* | 5/2013 | Kalevo | H04N 5/2351 348/221.1 |
| 9,344,637 B2* | 5/2016 | Kasai | H04N 9/045 |
| 2005/0231606 A1 | 10/2005 | Suzuki | |
| 2009/0002528 A1* | 1/2009 | Manabe | H04N 5/2355 348/248 |

FOREIGN PATENT DOCUMENTS

| | | |
|---|---|---|
| JP | 2008-270832 A | 11/2008 |
| JP | 2012-205030 A | 10/2012 |

OTHER PUBLICATIONS

International Preliminary Report on Patentability of PCT Application No. PCT/JP2015/065576, dated Feb. 2, 2017, 6 pages of English Translation and 3 pages of IPRP.

* cited by examiner

IMAGING CONTROL DEVICE, IMAGING APPARATUS, AND IMAGING CONTROL METHOD

CROSS REFERENCE TO RELATED APPLICATIONS

This application is a U.S. National Phase of International Patent Application No. PCT/JP2015/065576 filed on May 29, 2015, which claims priority benefit of Japanese Patent Application No. JP 2014-147583 filed in the Japan Patent Office on Jul. 18, 2014. Each of the above-referenced applications is hereby incorporated herein by reference in its entirety.

TECHNICAL FIELD

The present technology relates to an imaging control device, an imaging apparatus, and an imaging control method, and specifically, to an imaging control device in which two images obtained by two-time photographing are combined to generate an image with an expanded dynamic range, an imaging apparatus, an imaging control method thereof, and a program that causes a computer to execute the method.

BACKGROUND ART

Hitherto, in photographing of a subject with a large difference in luminance between a bright part and a dark part in an imaging apparatus such as a camera, photographing with a changed exposure condition is performed plural times, and obtained images are combined, thereby performing the photographing with an expanded dynamic range of the imaging apparatus. For example, such a system is proposed that a histogram is generated from an image signal obtained by first photographing and it is determined with the histogram whether or not second photographing is performed and, in the second photographing, an exposure condition is obtained from the histogram acquired by the first photographing (see, for example, Patent Literature 1).

CITATION LIST

Patent Literature

Patent Literature 1: JP H8-214211A

SUMMARY OF INVENTION

Technical Problem

The hitherto-known technology has a problem that it is not possible to obtain an appropriate exposure condition in the second photographing. That is, since an image signal corresponding to an area with high luminance of the subject is frequently saturated in the first photographing, a histogram obtained from the image signal does not completely match a distribution of luminance of the subject. Therefore, if the second photographing is performed under an exposure condition obtained from the histogram, an acquired image is unnecessarily exposed.

The present technology is devised in consideration of the situations, and has an object to obtain an appropriate exposure condition even in second photographing when a plurality of images acquired by two-time photographing are combined to generate an image with an expanded dynamic range.

Solution to Problem

The present technology has been achieved for solving the above problem, and a first aspect of the present technology provides an imaging control device including: an exposure control unit configured to control an imaging element including a normal pixel for generating an image signal and a low-sensitivity pixel for generating a low-sensitivity image signal and having lower photoelectric conversion sensitivity to visible light than the normal pixel under a predetermined exposure condition and cause the imaging element to output the image signal and the low-sensitivity image signal; a low-sensitivity histogram generating unit configured to generate a low-sensitivity histogram indicating an appearance frequency distribution of the low-sensitivity image signal based on the low-sensitivity image signal; a short-time exposure condition calculating unit configured to calculate a short-time exposure condition with an exposure time shorter than the exposure condition based on the generated low-sensitivity histogram; a short-time exposure control unit configured to control the imaging element under the calculated short-time exposure condition and cause the imaging element to output a short-time exposure image signal as an image signal generated by the normal pixel; and a combining unit configured to combine the image signal and the short-time exposure image signal. As a consequence, such an operation is given that a short-time exposure condition with a short exposure time is calculated based on a low-sensitivity histogram with a low-sensitivity image signal.

Further, according to the first aspect, the imaging control device may further include: a normal-sensitivity histogram generating unit configured to generate a normal-sensitivity histogram indicating an appearance frequency distribution of the image signal based on the image signal; and a control unit configured to cause the short-time exposure control unit to perform the control based on the generated normal-sensitivity histogram. As a consequence, such an operation is given that photographing with short-time exposure is performed based on a normal-sensitivity histogram with an image signal obtained from a normal signal.

Further, as a second aspect of the present technology, there is provided an imaging apparatus including: an imaging element including a normal pixel for generating an image signal and a low-sensitivity pixel for generating a low-sensitivity image signal and having lower photoelectric conversion sensitivity to visible light than the normal pixel; and an imaging control device configured to control the imaging element. The imaging control device includes an exposure control unit configured to control the imaging element under a predetermined exposure condition and cause the imaging element to output the image signal and the low-sensitivity image signal, a low-sensitivity histogram generating unit configured to generate a low-sensitivity histogram indicating an appearance frequency distribution of the low-sensitivity image signal based on the low-sensitivity image signal, a short-time exposure condition calculating unit configured to calculate a short-time exposure condition with an exposure time shorter than the exposure condition based on the generated low-sensitivity histogram, a short-time exposure control unit configured to control the imaging element under the calculated short-time exposure condition and cause the imaging element to output a short-time exposure image signal as an image signal generated by the normal pixel, and a combining unit configured to combine the image signal and the short-time exposure image signal. As a consequence, such an operation is given that a short-time exposure condition with a short exposure time is calculated based on a low-sensitivity histogram of a low-sensitivity image signal.

Further, according to the second aspect, the imaging apparatus may further include an infrared cut-filter configured to cut off infrared light. The normal pixel may be a visible pixel corresponding to visible light, and the low-sensitivity pixel may be an infrared pixel corresponding to infrared light. As a consequence, such an operation is given that an infrared pixel is used as a low-sensitivity pixel.

Further, a third aspect of the present technology provides an imaging control method including: an exposure controlling step of controlling an imaging element including a normal pixel for generating an image signal and a low-sensitivity pixel for generating a low-sensitivity image signal and having lower photoelectric conversion sensitivity to visible light than the normal pixel under a predetermined exposure condition and causing the imaging element to output the image signal and the low-sensitivity image signal; a low-sensitivity histogram generating step of generating a low-sensitivity histogram indicating an appearance frequency distribution of the low-sensitivity image signal based on the low-sensitivity image signal; a short-time exposure condition calculating step of calculating a short-time exposure condition with an exposure time shorter than the exposure condition based on the generated low-sensitivity histogram; a short-time exposure controlling step of controlling the imaging element under the calculated short-time exposure condition and causing the imaging element to output a short-time exposure image signal as an image signal generated by the normal pixel; and a combining step of combining the image signal and the short-time exposure image signal. As a consequence, such an operation is given that a short-time exposure condition with a short exposure time is calculated based on a low-sensitivity histogram of a low-sensitivity image signal.

Advantageous Effects of Invention

According to the present technology, such an advantageous effect is obtained that an appropriate exposure condition is obtained even in second photographing when a plurality of images acquired by two-time photographing are combined to generate an image with an expanded dynamic range. Note that the effects described here are not necessarily limited, and any effect that is desired to be described in the present disclosure may be exhibited.

DESCRIPTION OF EMBODIMENT(S)

Hereinbelow, a description will be given of a mode for carrying out the present technology (hereinbelow, referred to as an embodiment).

1. Configuration according to Embodiment
2. Operation according to Embodiment

1. Configuration According to Embodiment

[Configuration of Imaging Apparatus]

Figure 1:
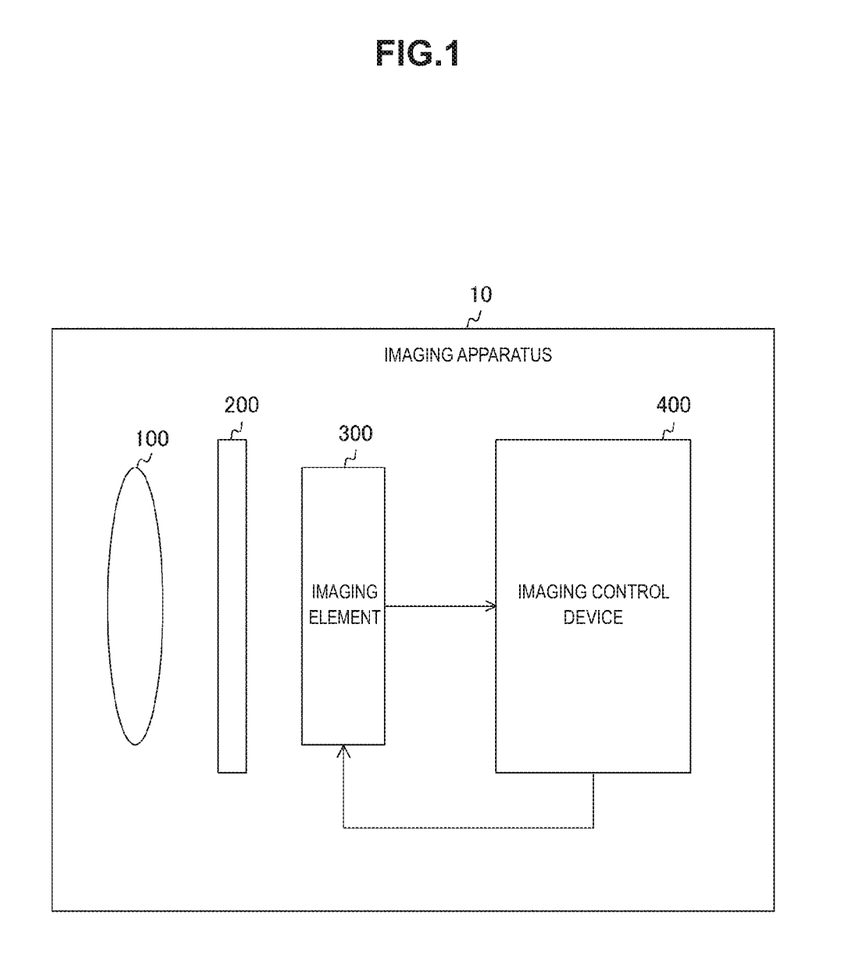
FIG. 1 is a diagram showing a configuration example of an imaging apparatus according to an embodiment of the present technology.

FIG. 1 is a diagram showing a configuration example of an imaging apparatus according to an embodiment of the present technology. An imaging apparatus 10 in the diagram includes a lens 100, an infrared cut-filter 200, an imaging element 300, and an imaging control device 400.

The lens 100 optically forms an image of a subject onto the imaging element 300. The infrared cut-filter 200 cuts off infrared light included in light incident on the imaging element 300. The imaging element 300 converts an optical image formed by the lens 100 into an image signal and outputs the signal. Pixels each generating an image signal are two-dimensionally arranged on a surface formed with the optical image in the imaging element 300. The pixel has a photoelectric conversion element that performs photoelectric conversion, and outputs an electrical signal corresponding to luminance of the light incident on the pixel. In general, the imaging element includes an A/D converter, and converts the electrical signal into a digital signal and outputs the signal as an image signal. The imaging element 300 according to the embodiment of the present technology includes, as the pixels, a normal pixel that generates an image signal and a low-sensitivity pixel that generates a low-sensitivity image signal and has lower photoelectric conversion sensitivity to visible light than the normal pixel. A description will be given of a configuration of the imaging element 300, the normal pixel, and the low-sensitivity pixel later.

The imaging control device 400 controls the imaging in the imaging element 300. Further, the imaging control device 400 performs processing of the image signal and the low-sensitivity image signal that are output by the imaging element 300, which will be described later. Furthermore, the imaging control device 400 controls the whole imaging apparatus. In addition, the imaging apparatus 10 includes a stop (not shown) that changes an amount of light incident on the imaging element 300 and the like.

[Configuration of Imaging Element]

Figure 2:
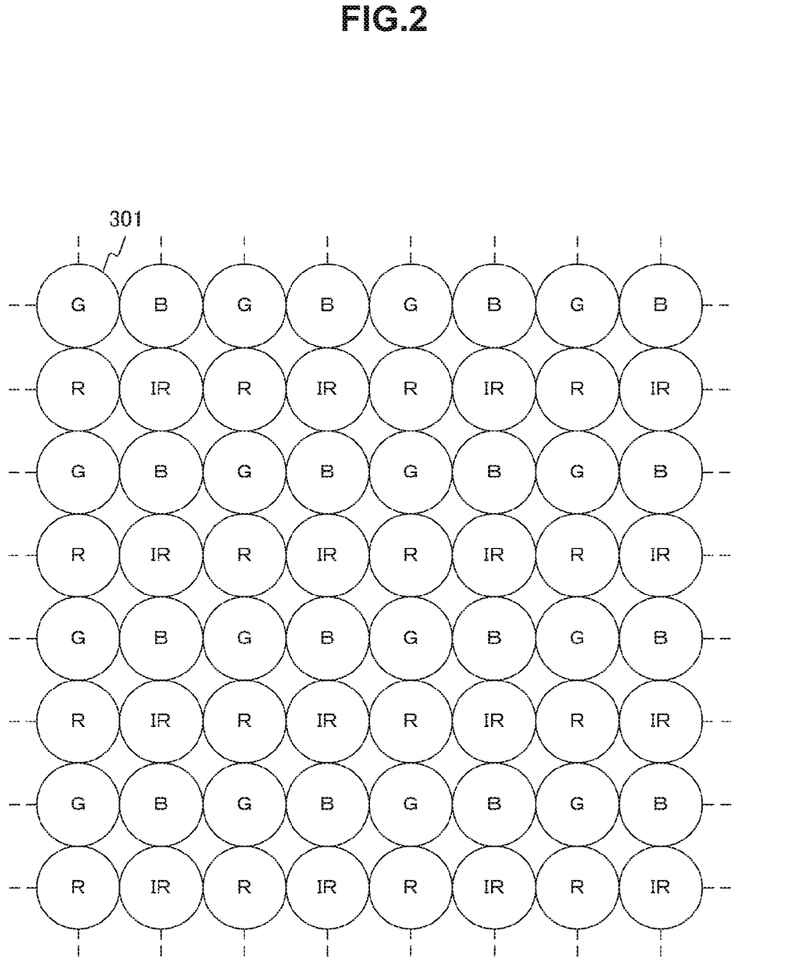
FIG. 2 is a diagram showing a configuration example of an imaging element according to an embodiment of the present technology.
Figure 3A:
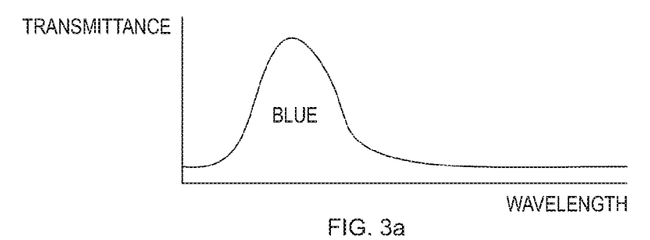
FIGS. 3a, 3b, 3c, 3d and 3e are a diagram showing an example of spectral characteristics of color filters and an infrared cut-filter of pixels used for an imaging element according to an embodiment of the present technology.
Figure 3B:
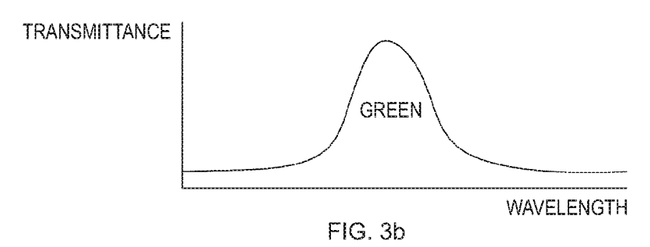
Figure 3C:
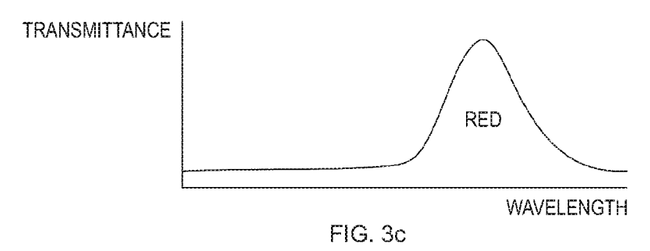
Figure 3D:
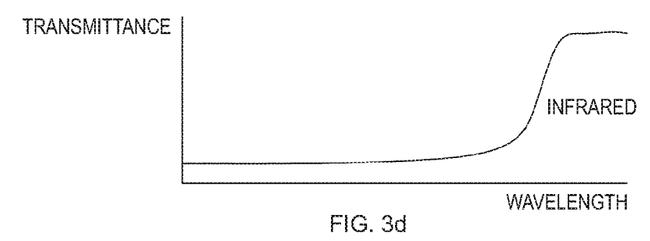
Figure 3E:
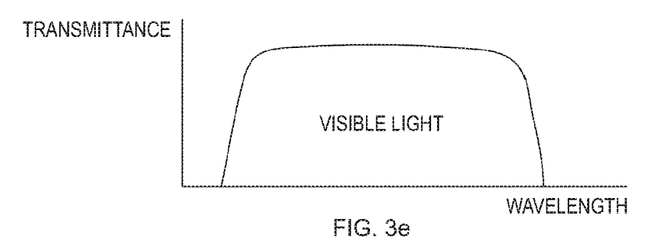
Figure 4A:
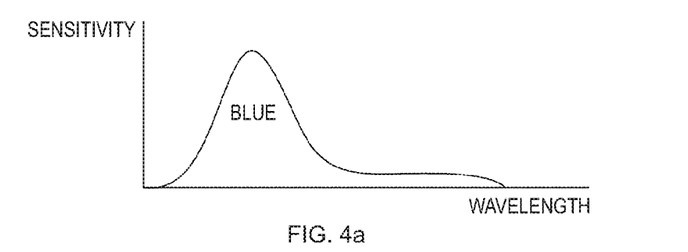
FIGS. 4a, 4b, 4c and 4d are a diagram showing an example of pixel characteristics in an imaging element in a case of using an infrared cut-filter according to an embodiment of the present technology.
Figure 4B:
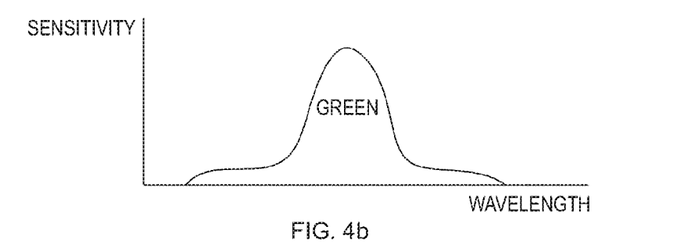
Figure 4C:
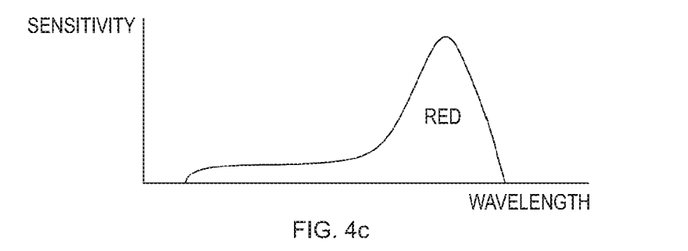
Figure 4D:
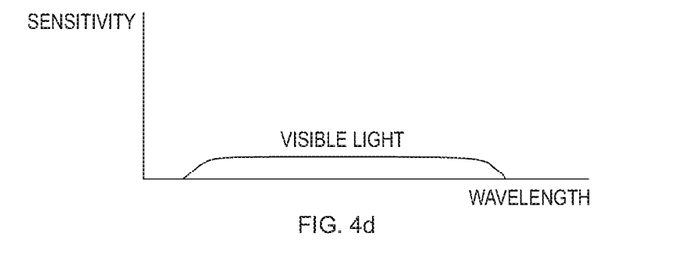

FIG. 2 is a diagram showing a configuration example of an imaging element according to the embodiment of the present technology. The diagram shows the configuration of a pixel surface as a surface on which pixels of the imaging element 300 are arranged. Pixels 301 are arranged on the pixel surface in a two-dimensional grid. Reference symbols R, G, B, and IR added to the pixels 301 denote kinds of the pixels 301. Reference symbol R denotes a pixel (R pixel) corresponding to red light, reference symbol G denotes a pixel (G pixel) corresponding to green light, reference symbol B denotes a pixel (B pixel) corresponding to blue light, and reference symbol IR denotes a pixel (IR pixel) corresponding to infrared light. A photoelectric conversion element in the pixel has sensitivity to light of a wavelength in a wide range from visible light to infrared light. In order to set the element to a pixel corresponding to only light of a specific wavelength, color filters with spectral characteristics varied for each pixel are arranged. The color filters will be described later. The four types of pixels are regularly arranged on the pixel surface in the imaging element 300. According to the embodiment of the present technology, the R pixel, the G pixel, and the B pixel are used as normal pixels, and the IR pixel is used as the low-sensitivity pixel.

[Configuration of Pixel]

FIGS. 3a, 3b, 3c, 3d and 3e are a diagram showing an example of spectral characteristics of the color filters and the infrared cut-filter of the pixels used for the imaging element according to the embodiment of the present technology. Reference symbol a in the diagram denotes a relationship between a wavelength and a transmittance of the color filter arranged in the B pixel. Reference symbol b in the diagram denotes a relationship between a wavelength and a transmittance of the color filter arranged in the G pixel. Reference symbol c in the diagram denotes a relationship between a wavelength and a transmittance of the color filter arranged in the R pixel. Reference symbol d in the diagram denotes a relationship between a wavelength and a transmittance of the color filter arranged in the IR pixel. Reference symbol e in the diagram denotes a relationship between a wavelengths and a transmittance of the infrared cut-filter. The color filters with high transmittance to the light corresponding to the respective pixels described above are arranged, thereby setting the pixels with desired characteristics. For example, the color filter of the IR pixel shown by FIG. 3d has a low transmittance in the visible-light area and a high transmittance in the infrared light.

The pixels using the color filters become pixels with low sensitivity to the visible light and high sensitivity to the infrared light, i.e., IR pixels. Such a case is considered of using the infrared cut-filter with spectral characteristics shown by FIG. 3e for the imaging element 300 having the pixels described above. As will be obviously understood from the diagram, the spectral characteristics of the infrared cut-filter have a high transmittance to the visible light and a low transmittance to the infrared light, and therefore have hardly influence on the R, G, and B pixels. On the other hand, regarding the IR pixel, the high transmittance in the infrared light area of the color filter in the relevant pixel is offset, thereby obtaining a low transmittance.

[Characteristics of Pixel in Case of Using Infrared Cut-Filter]

FIGS. 4a, 4b, 4c and 4d are a diagram showing an example of characteristics of pixels in the imaging element in the case of using the infrared cut-filter according to the embodiment of the present technology. Reference symbol a in the diagram denotes a relationship between a wavelength and sensitivity of the B pixel. Reference symbol b in the diagram denotes a relationship between a wavelength and sensitivity of the G pixel. Reference symbol c in the diagram denotes a relationship between a wavelength and sensitivity of the R pixel. Reference symbol d in the diagram denotes a relationship between a wavelength and sensitivity of the IR pixel. The R, G, and B pixels have characteristics of having sensitivities to light of corresponding wavelengths without being affected by the infrared cut-filter, respectively. On the other hand, the IR pixel has the sensitivity of approximately zero to the infrared light area with the infrared cut-filter, and has characteristics of having low sensitivity to the visible light. As mentioned above, according to the embodiment of the present technology, by use of the infrared cut-filter, the IR pixel is set as the pixel corresponding to only the visible light and also as a low-sensitivity pixel with low sensitivity. Note that, according to the embodiment of the present technology, the sensitivity of the low-sensitivity pixel is assumed to be one-tenth of the sensitivity of the normal pixel.

[Configuration of Imaging Control Device]

Figure 5:
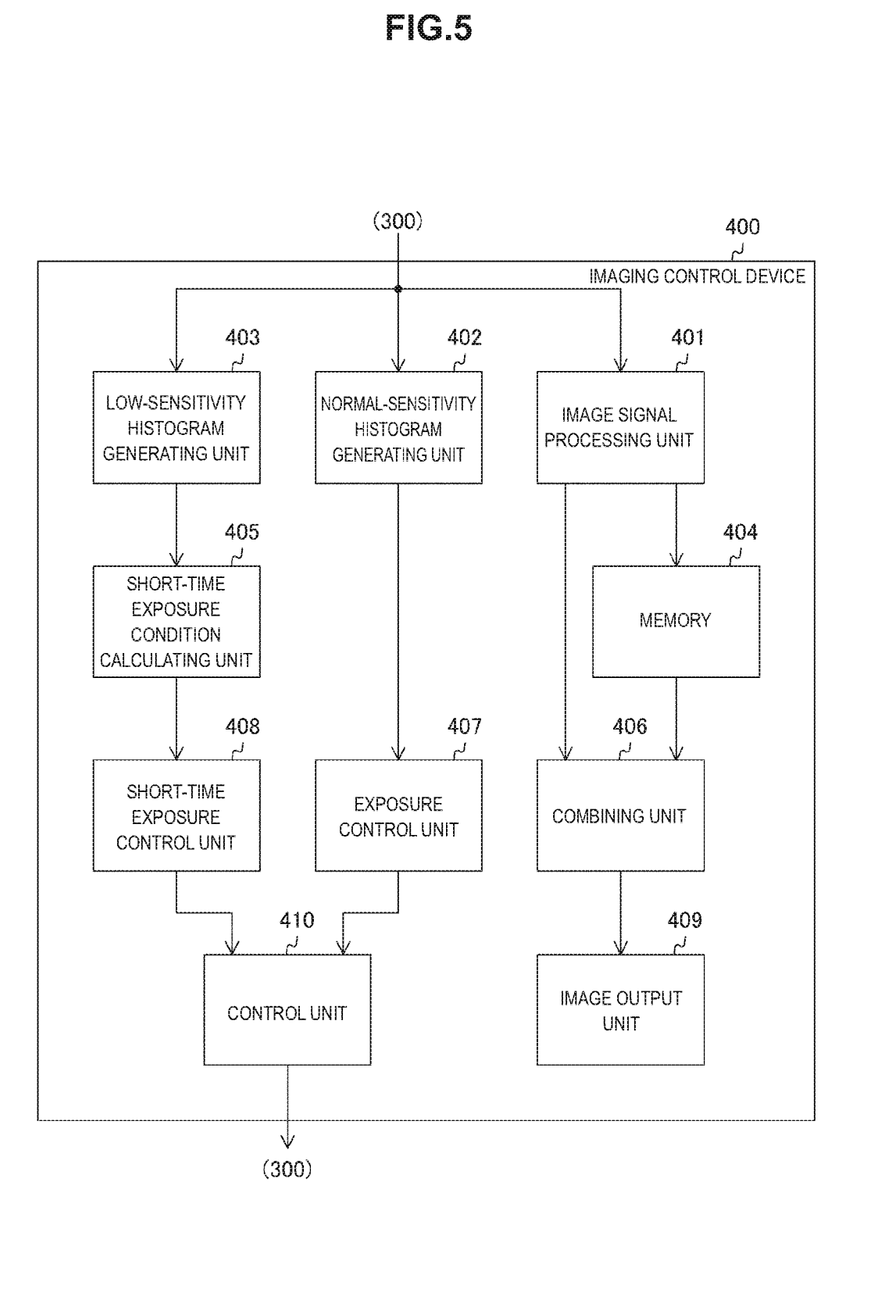
FIG. 5 is a diagram showing a configuration example of an imaging apparatus according to an embodiment of the present technology.

FIG. 5 is a diagram showing a configuration example of the imaging apparatus according to the embodiment of the present technology. The imaging control device 400 in the diagram includes an image signal processing unit 401, a normal-sensitivity histogram generating unit 402, and a low-sensitivity histogram generating unit 403. Further, the imaging control device 400 includes a memory 404, a short-time exposure condition calculating unit 405, a combining unit 406, an exposure control unit 407, a short-time exposure control unit 408, an image output unit 409, and a control unit 410.

The image signal processing unit 401 processes an image signal output by the imaging element 300. The processing is, e.g., de-mosaic processing. This is processing for generating image signals of other colors that respective pixels do not have, for the R, G, and B pixels. The memory 404 is a memory that stores the image signal. The memory 404 holds the image signal obtained by the first photographing in the case of generating an image with an expanded dynamic range as a result of two-time photographing. The combining unit 406 combines the image signal obtained by the first photographing held in the memory 404 and the image signal obtained by the second photographing, output by the image signal processing unit 401, and outputs the combined signal. Here, depending on a subject, it is not possible to expand the dynamic range even by two-time photographing. In this case, the combining unit 406 does not perform the combining processing, and outputs the image signal held in the memory 404. The image output unit 409 outputs the image signal output by the combining unit 406 to the outside of the imaging apparatus 10. The image output unit 409 changes a format of the image signal if necessity and outputs the resultant image signal.

The normal-sensitivity histogram generating unit 402 generates the normal-sensitivity histogram indicating the distribution of appearance frequency of the image signal based on the image signal. The normal-sensitivity histogram is used for exposure control in the first photographing with the imaging apparatus 10. The exposure control unit 407 controls the exposure. The exposure control unit 407 controls the exposure in the first photographing with the imaging apparatus 10. Under the exposure control, a signal level of the image signal output by changing an amount of exposure in the imaging element in the photographing is controlled to a predetermined value. In general, the amount of exposure can be controlled by changing an exposure time as a time from the start to the end of photoelectric conversion of the imaging element 300 and an amount of incident light with the stop. The exposure control is performed by controlling the exposure time so as to set an estimated value of the image signal, e.g., an average value of the image signal to a predetermined signal level. The control method will be described later.

The low-sensitivity histogram generating unit 403 generates a low-sensitivity histogram indicating the distribution of appearance frequency of the low-sensitivity image signal based on the low-sensitivity image signal. The low-sensitivity histogram is used for calculating the exposure condition in the second photographing with the imaging apparatus 10. The short-time exposure condition calculating unit 405 calculates the exposure condition in the second photographing with the imaging apparatus 10. The calculation of the exposure condition will be described later. The short-time exposure control unit 408 controls the exposure. The short-time exposure control unit 408 controls the exposure in the second photographing with the imaging apparatus 10 based on the exposure condition calculated by the short-time exposure condition calculating unit 405.

The control unit 410 selects a control signal output by the exposure control unit 407 or the short-time exposure control unit 408, and outputs the selected signal to the imaging element 300. Further, the control unit 410 has a function for causing the short-time exposure control unit 408 to perform the exposure control based on the normal-sensitivity histogram generated by the normal-sensitivity histogram generating unit 402. Furthermore, the control unit 410 also performs the whole control of the imaging control device 400.

[Exposure Control and Calculation of Short-Time Exposure Condition]

Figure 6A:
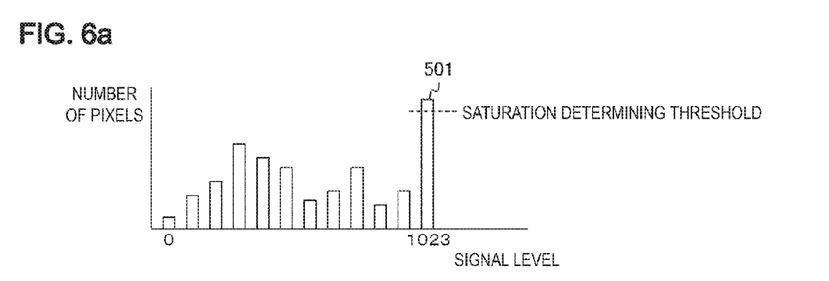
FIGS. 6a, 6b and 6c are a diagram explaining exposure control and a method for calculating a short-time exposure condition according to an embodiment of the present technology.
Figure 6B:
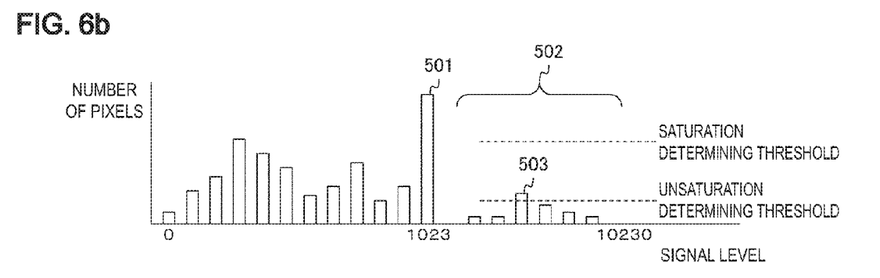
Figure 6C:
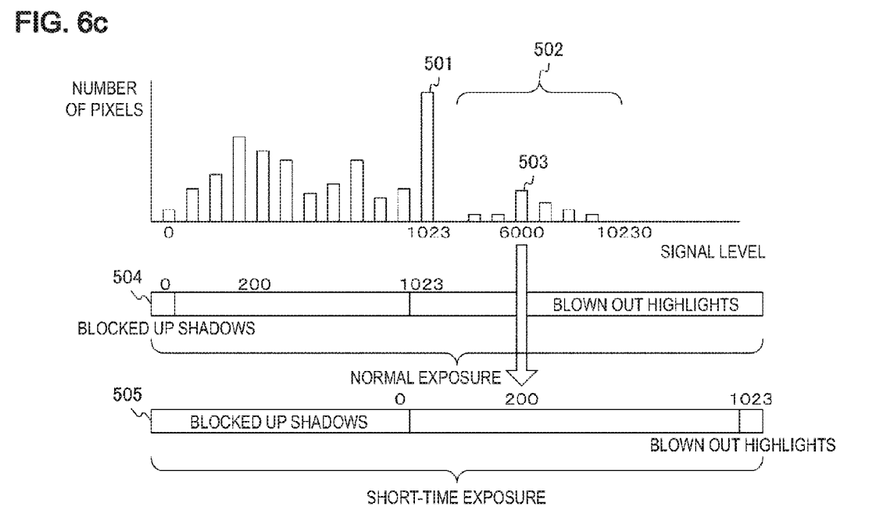

FIGS. 6a, 6b and 6c are a diagram explaining exposure control and a method for calculating a short-time exposure condition according to the embodiment of the present technology. Reference symbol a in the diagram denotes an example of the normal-sensitivity histogram generated by the normal-sensitivity histogram generating unit 402, in which the abscissa denotes a signal level of the image signal output by the normal pixel and the ordinate denotes the number of corresponding pixels. The image signal according to the embodiment of the present technology is a 10-bit digital signal, and the signal level changes in a range from a value "0" to a value "1023". The exposure control unit 407 calculates an average value of the image signals and controls the exposure time so that the average value is equal to a value of 20% of a maximal signal level. In a of the diagram, the exposure time is controlled so that the signal level is a value "200". When the subject includes an area with high luminance, the image signal of the pixel included in the area with high luminance is saturated, that is, so-called blown out highlights happen. In this case, photographing with an expanded dynamic range is necessary. The determination is performed as follows. That is, the number of pixels in the pixels in a saturated state of the signal level in the normal-sensitivity histogram is calculated. In a of the diagram, the number of pixels of a graph 501 with the signal level as 1023 is calculated. If the number of pixels is more than or equal to a predetermined saturation determining threshold, it is determined that the photographing with the expanded dynamic range is necessary. In this case, the low-sensitivity histogram generating unit 403 generates a low-sensitivity histogram based on the low-sensitivity image signal of the low-sensitivity pixel existing around pixels in the saturated state of the signal level.

Reference symbol b in the diagram denotes one graph describing a normal-sensitivity histogram and a low-sensitivity histogram. Herein, a graph 502 denotes the low-sensitivity histogram. Since it is assumed that the sensitivity of the low-sensitivity pixel is one-tenth of the normal pixel as mentioned above, correction is performed by multiplying ten as reciprocal of a sensitivity rate to the low-sensitivity image signal. Based on the low-sensitivity histogram, it is further determined whether or not photographing is performed with an expanded dynamic range. The determination is performed with the following sequence. First, in the graph 502, there is a signal level (hereinbelow, referred to as a peak low-sensitivity pixel-number signal level) with a largest number of pixels. Herein, a graph 503 denotes a graph of the peak low-sensitivity pixel-number signal level. When the number of pixels is less than a saturation determining threshold in the low-sensitivity histogram and more than or equal to an unsaturation determining threshold, it is determined that it is possible to perform the photographing with the expanded dynamic range. In this case, the short-time exposure condition calculating unit 405 calculates the exposure condition of the second photographing.

Reference symbol c in the diagram denotes a method for calculating the short-time exposure condition. That is, the graph describing the normal-sensitivity histogram and the low-sensitivity histogram shows an exposure range 504 of the normal exposure in the first photographing and an exposure range 505 of the short-time exposure in the second photographing. As mentioned above, in the normal exposure, it is controlled to set an average value of the signal level of the image signal, that is, the average signal level of the normal histogram in the diagram to a value "200". Note that, when it is controlled that the average signal level is a value "0", the image is in a state of blocked up shadows. When it is controlled to set the average signal level to a value "1023", the image is in a state of blown out highlights. On the other hand, in the short-time exposure, an area in a state of the blown out highlights in the normal exposure becomes the exposure range.

The short-time exposure condition is calculated as follows based on the peak low-sensitivity pixel-number signal level in the aforementioned graph 503. When the signal level is a value "6000", such an exposure condition is calculated that the average signal level is a value "200" in the normal exposure. Specifically, since 200/6000=1/30, the exposure time is one-thirtieth of the normal exposure. As mentioned above, according to the embodiment of the present technology, the exposure condition of the second photographing is estimated with the low-sensitivity image signal, and the photographing is performed.

2. Operation According to Embodiment

Next, a description is given of an operation of the imaging apparatus that generates an image with an expanded dynamic range by two-time photographing.

[Processing Sequence of Imaging Control Processing]

Figure 7:
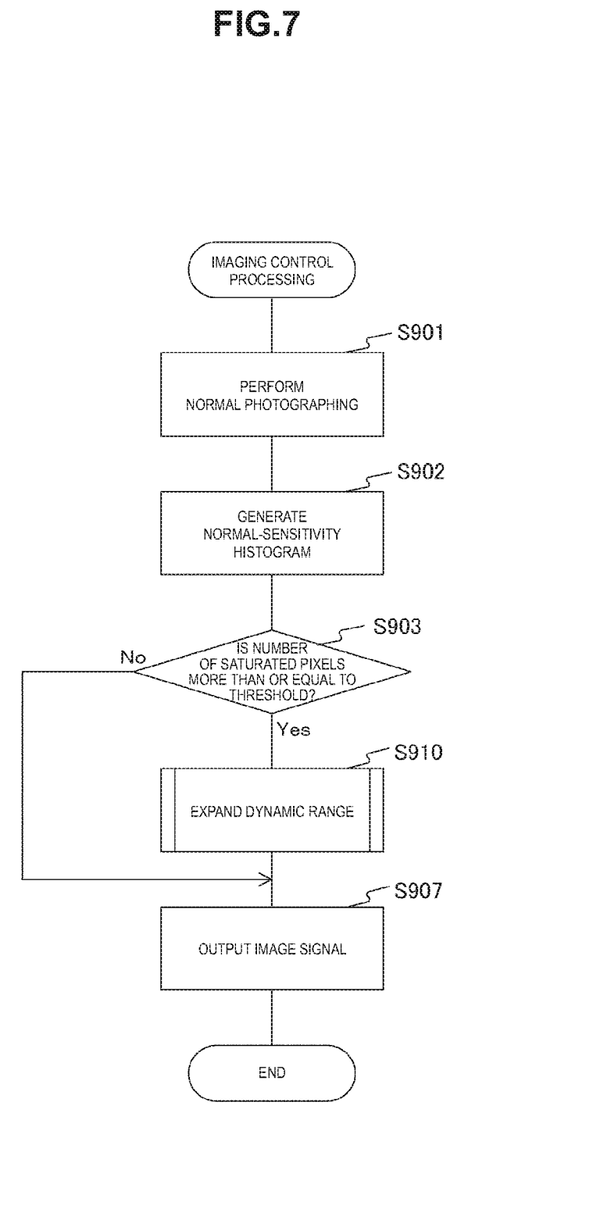
FIG. 7 is a diagram showing an example of a processing sequence of imaging control processing according to an embodiment of the present technology.

FIG. 7 is a diagram showing an example of a processing sequence of imaging control processing according to the embodiment of the present technology. First, the imaging control device 400 performs the normal photographing as first photographing (in step S901). Specifically, the exposure control unit 407 controls the exposure of the imaging element 300 and the photographing is performed. As a consequence, the image signal and the low-sensitivity image signal are output to the imaging control device 400 from the imaging element 300. Further, the image signal is held in the memory 404. Next, the imaging control device 400 generates the normal-sensitivity histogram from the image signal (in step S902). Subsequently, the imaging control device 400 determines based on the normal-sensitivity histogram whether or not a number of saturated pixels is more than or equal to a saturation determining threshold (in step S903). If the number of saturated pixels is less than the saturation determining threshold (No in step S903), the processing shifts to step S907. On the other hand, if the number of saturated pixels is more than or equal to the saturation determining threshold (Yes in step S903), dynamic-range expanding processing is performed (in step S910). After that, an obtained image signal is output (in step S907). Here, if the photographing is performed with the expanded dynamic range in the dynamic-range expanding processing, such an image signal is output as a result of combining an image signal obtained by the photographing and an image signal obtained by normal photographing. On the other hand, if the photographing is not performed with the expanded dynamic range, the image signal obtained by the normal photographing is output.

[Processing Sequence of Dynamic-Range Expanding Processing]

Figure 8:
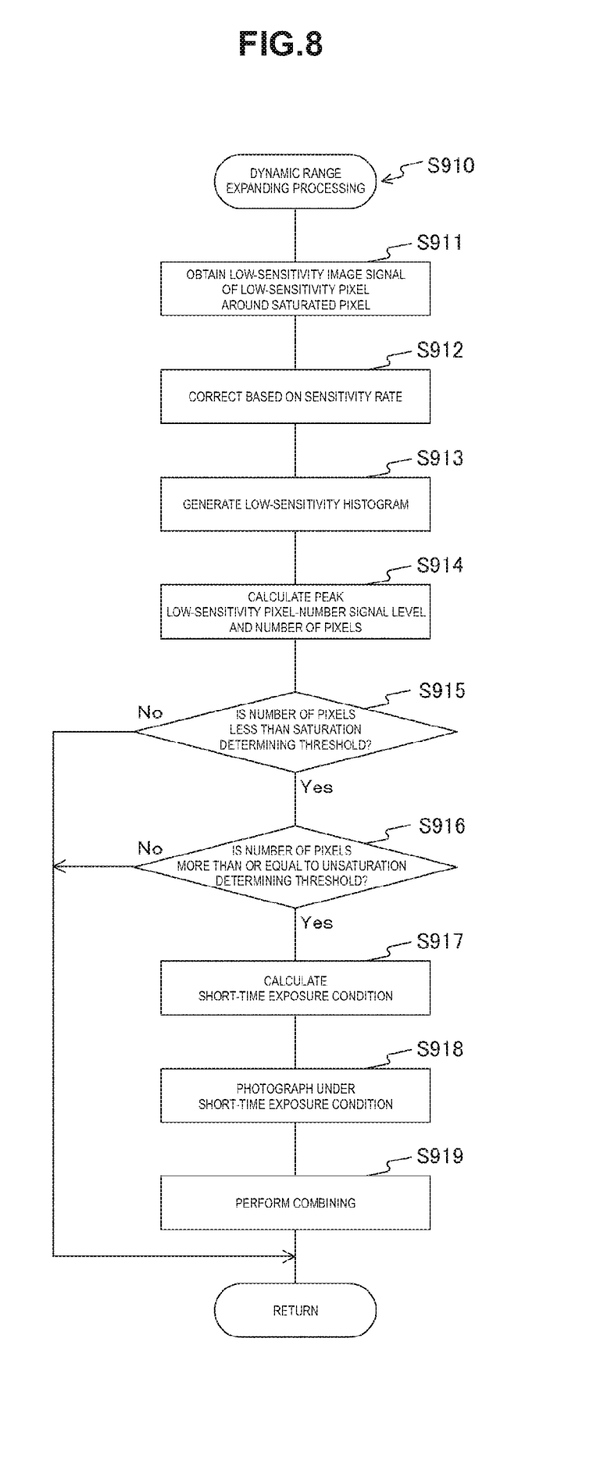
FIG. 8 is a diagram showing an example of a processing sequence of dynamic-range expanding processing according to an embodiment of the present technology.

FIG. 8 is a diagram showing an example of a processing sequence of the dynamic-range expanding processing according to the embodiment of the present technology. First, the imaging control device 400 obtains the low-sensitivity image signal of the low-sensitivity pixel around a saturated pixel (in step S911). Next, the imaging control device 400 performs correction based on a sensitivity rate (in step S912). According to the embodiment of the present technology, the signal level of the low-sensitivity image signal is ten times, and the correction is performed. Next, the imaging control device 400 generates the low-sensitivity histogram (in step S913). Subsequently, the imaging control device 400 calculates the peak low-sensitivity pixel-number signal level and the number of pixels corresponding thereto (in step S914). If the number of pixels is more than or equal to the saturation determining threshold, or less than the unsaturation determining threshold (No in step S915 or No in step S916), the dynamic-range expanding processing ends without the photographing with the expanded dynamic range.

On the other hand, if the number of pixels is less than the saturation determining threshold and more than or equal to the unsaturation determining threshold (Yes in step S915 and Yes in step S916), the imaging control device 400 calculates the short-time exposure condition (in step S917). Next, the imaging control device 400 performs the second photographing under the short-time exposure condition (in step S918). In this case, the short-time exposure control unit 408 controls the exposure of the imaging element 300, and the photographing is performed. Finally, the imaging control device 400 combines the image signal obtained by the second photographing and the image signal in the first photographing held in the memory 404 (in step S919), and the dynamic-range expanding processing ends.

As mentioned above, according to the embodiment of the present technology, when the image with the expanded dynamic range is generated, it is possible to set an appropriate exposure condition based on the low-sensitivity image signal of the low-sensitivity pixel also in the second photographing.

The above-described embodiments are examples for embodying the present technology, and matters in the embodiments each have a corresponding relationship with disclosure-specific matters in the claims. Likewise, the matters in the embodiments and the disclosure-specific matters in the claims denoted by the same names have a corresponding relationship with each other. However, the present technology is not limited to the embodiments, and various modifications of the embodiments may be embodied in the scope of the present technology without departing from the spirit of the present technology.

The processing sequences that are described in the embodiments described above may be handled as a method having a series of sequences or may be handled as a program for causing a computer to execute the series of sequences and recording medium storing the program. As the recording medium, a hard disk, a CD (Compact Disc), an MD (Mini-Disc), and a DVD (Digital Versatile Disk), a memory card, and a Blu-ray disc (registered trademark) can be used.

In addition, the effects described in the present specification are not limiting but are merely examples, and there may be additional effects.

Additionally, the present technology may also be configured as below.

(1)

An imaging control device including:

an exposure control unit configured to control an imaging element including a normal pixel for generating an image signal and a low-sensitivity pixel for generating a low-sensitivity image signal and having lower photoelectric conversion sensitivity to visible light than the normal pixel under a predetermined exposure condition and cause the imaging element to output the image signal and the low-sensitivity image signal;

a low-sensitivity histogram generating unit configured to generate a low-sensitivity histogram indicating an appearance frequency distribution of the low-sensitivity image signal based on the low-sensitivity image signal;

a short-time exposure condition calculating unit configured to calculate a short-time exposure condition with an exposure time shorter than the exposure condition based on the generated low-sensitivity histogram;

a short-time exposure control unit configured to control the imaging element under the calculated short-time exposure condition and cause the imaging element to output a short-time exposure image signal as an image signal generated by the normal pixel; and a combining unit configured to combine the image signal and the short-time exposure image signal.

(2)

The imaging control device according to (1), further including:

a normal-sensitivity histogram generating unit configured to generate a normal-sensitivity histogram indicating an appearance frequency distribution of the image signal based on the image signal; and a control unit configured to cause the short-time exposure control unit to perform the control based on the generated normal-sensitivity histogram.

(3)

An imaging apparatus including:

an imaging element including a normal pixel for generating an image signal and a low-sensitivity pixel for generating a low-sensitivity image signal and having lower photoelectric conversion sensitivity to visible light than the normal pixel; and an imaging control device configured to control the imaging element, wherein the imaging control device includes an exposure control unit configured to control the imaging element under a predetermined exposure condition and cause the imaging element to output the image signal and the low-sensitivity image signal, a low-sensitivity histogram generating unit configured to generate a low-sensitivity histogram indicating an appearance frequency distribution of the low-sensitivity image signal based on the low-sensitivity image signal, a short-time exposure condition calculating unit configured to calculate a short-time exposure condition with an exposure time shorter than the exposure condition based on the generated low-sensitivity histogram, a short-time exposure control unit configured to control the imaging element under the calculated short-time exposure condition and cause the imaging element to output a short-time exposure image signal as an image signal generated by the normal pixel, and a combining unit configured to combine the image signal and the short-time exposure image signal.

(4)

The imaging apparatus according to (3), further including:

an infrared cut-filter configured to cut off infrared light, wherein the normal pixel is a visible pixel corresponding to visible light, and the low-sensitivity pixel is an infrared pixel corresponding to infrared light.

(5)

An imaging control method including:

an exposure controlling step of controlling an imaging element including a normal pixel for generating an image signal and a low-sensitivity pixel for generating a low-sensitivity image signal and having lower photoelectric conversion sensitivity to visible light than the normal pixel under a predetermined exposure condition and causing the imaging element to output the image signal and the low-sensitivity image signal;

a low-sensitivity histogram generating step of generating a low-sensitivity histogram indicating an appearance frequency distribution of the low-sensitivity image signal based on the low-sensitivity image signal;

a short-time exposure condition calculating step of calculating a short-time exposure condition with an exposure time shorter than the exposure condition based on the generated low-sensitivity histogram;

a short-time exposure controlling step of controlling the imaging element under the calculated short-time exposure condition and causing the imaging element to output a short-time exposure image signal as an image signal generated by the normal pixel; and a combining step of combining the image signal and the short-time exposure image signal.

REFERENCE SIGNS LIST 10 imaging apparatus
100 lens
200 infrared cut-filter
300 imaging element
301 pixel
400 imaging control device
401 image signal processing unit
402 normal-sensitivity histogram generating unit
403 low-sensitivity histogram generating unit
404 memory
405 short-time exposure condition calculating unit
406 combining unit
407 exposure control unit
408 short-time exposure control unit
409 image output unit
410 control unit 501 to 503 graph
504 exposure range of normal exposure
505 exposure range of short-time exposure

The invention claimed is:

1. An imaging control device comprising:

an exposure control unit configured to: control an imaging element including a normal pixel to generate an image signal and a low-sensitivity pixel to generate a low-sensitivity image signal, the low-sensitivity pixel having lower photoelectric conversion sensitivity to visible light than the normal pixel under a predetermined exposure condition; and cause the imaging element to output the image signal and the low-sensitivity image signal;

a low-sensitivity histogram generating unit configured to generate a low-sensitivity histogram indicating an appearance frequency distribution of the low-sensitivity image signal based on the low-sensitivity image signal;

a short-time exposure condition calculating unit configured to calculate a short-time exposure condition with an exposure time shorter than the predetermined exposure condition based on the generated low-sensitivity histogram;

a short-time exposure control unit configured to control the imaging element under the calculated short-time exposure condition and cause the imaging element to output a short-time exposure image signal as the image signal generated by the normal pixel; and a combining unit configured to combine the image signal and the short-time exposure image signal.

2. The imaging control device according to claim 1, further comprising:

a normal-sensitivity histogram generating unit configured to generate a normal-sensitivity histogram indicating an appearance frequency distribution of the image signal based on the image signal; and a control unit configured to cause the short-time exposure control unit to control the imaging element based on the generated normal-sensitivity histogram.

3. An imaging apparatus comprising:

an imaging element including a normal pixel to generate an image signal and a low-sensitivity pixel to generate a low-sensitivity image signal, the low-sensitivity pixel having lower photoelectric conversion sensitivity to visible light than the normal pixel; and an imaging control device configured to control the imaging element, wherein the imaging control device includes
an exposure control unit configured to control the imaging element under a predetermined exposure condition and cause the imaging element to output the image signal and the low-sensitivity image signal, a low-sensitivity histogram generating unit configured to generate a low-sensitivity histogram indicating an appearance frequency distribution of the low-sensitivity image signal based on the low-sensitivity image signal, a short-time exposure condition calculating unit configured to calculate a short-time exposure condition with an exposure time shorter than the predetermined exposure condition based on the generated low-sensitivity histogram, a short-time exposure control unit configured to control the imaging element under the calculated short-time exposure condition and cause the imaging element to output a short-time exposure image signal as the image signal generated by the normal pixel, and a combining unit configured to combine the image signal and the short-time exposure image signal.

4. The imaging apparatus according to claim 3, further comprising:

an infrared cut-filter configured to cut off infrared light, wherein the normal pixel is a visible pixel corresponding to visible light, and the low-sensitivity pixel is an infrared pixel corresponding to infrared light.

5. An imaging control method comprising:

controlling an imaging element including a normal pixel for generating an image signal and a low-sensitivity pixel for generating a low-sensitivity image signal, the low-sensitivity pixel having lower photoelectric conversion sensitivity to visible light than the normal pixel under a predetermined exposure condition, and causing the imaging element to output the image signal and the low-sensitivity image signal;

generating a low-sensitivity histogram indicating an appearance frequency distribution of the low-sensitivity image signal based on the low-sensitivity image signal;

calculating a short-time exposure condition with an exposure time shorter than the predetermined exposure condition based on the generated low-sensitivity histogram;

controlling the imaging element under the calculated short-time exposure condition and causing the imaging element to output a short-time exposure image signal as the image signal generated by the normal pixel; and combining the image signal and the short-time exposure image signal.

* * * * *